T. H. S. CONE.
TESTING SYSTEM.
APPLICATION FILED APR. 17, 1919.
1,350,358.
Patented Aug. 24, 1920.
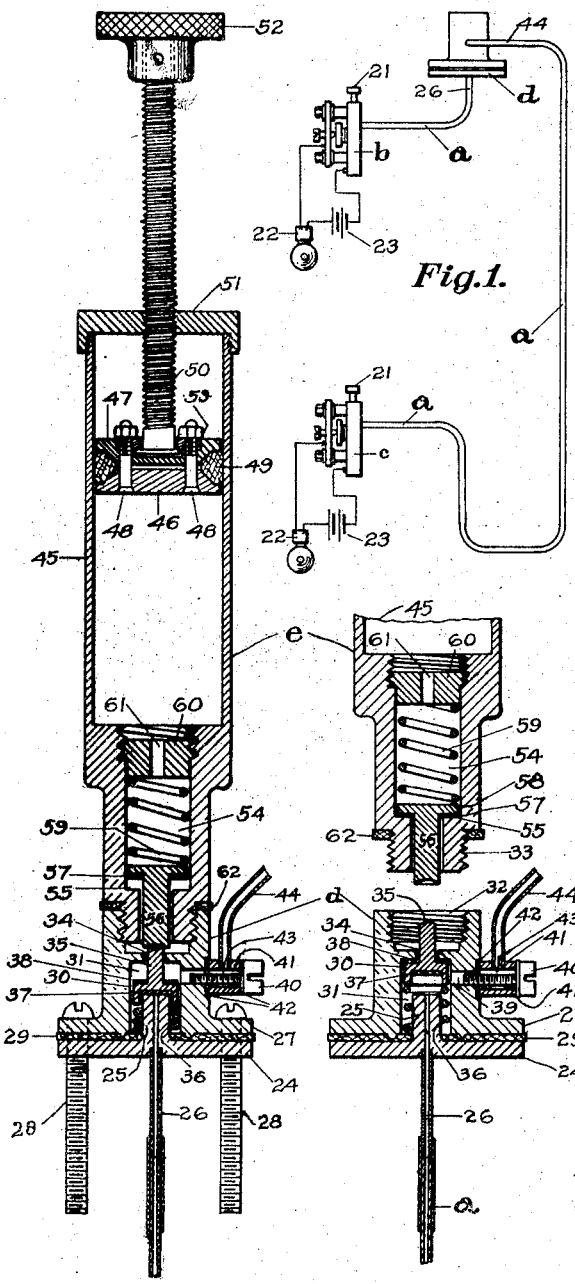
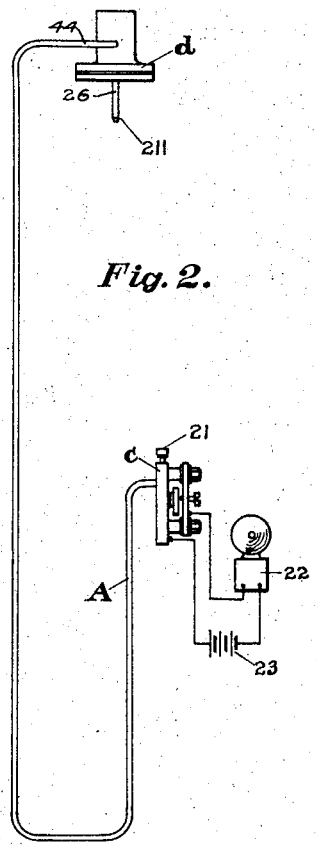
Fig.1.
Fig.2.
Fig.3.
Fig.4.
INVENTOR.
T. H. S. Cone
BY C. E. Beach
ATTORNEY.

UNITED STATES PATENT OFFICE.

THOMAS H. S. CONE, OF BOUNDBROOK, NEW JERSEY.

TESTING SYSTEM.

1,350,358. Specification of Letters Patent. Patented Aug. 24, 1920.

Application filed April 17, 1919. Serial No. 290,752.

*To all whom it may concern:*

Be it known that I, THOMAS H. S. CONE, a citizen of the United States, residing at Boundbrook, county of Somerset, and State of New Jersey, have invented certain new and useful Improvements in Testing Systems, of which the following is a specification.

This invention relates to systems for testing lines of conduit, piping or tubing and pressure detecting and manifesting devices employed in connection therewith, and this invention is particularly suited for manifesting the continuity of and freedom from obstructions in tubing lines or circuits which are provided for the purpose of detecting temperature changes, as well as for testing the operability of devices responsive thereto.

In maintaining tubing circuits of the character described, together with the various appliances employed in connection therewith, it is considered essential that tests shall be made from time to time. Heretofore, for the purposes of such tests, complicated and cumbersome adjustable valves have been so employed as to present serious hazards by setting up abnormal conditions, during the continuation of which, the operativeness of one or more tubing circuits is either seriously impaired or entirely suspended; and no means has heretofore been provided for dependably safeguarding against such tubing circuits being unintentionally left after test without any attempt to restore them to normal and effectively operative condition. Readily available means have been wholly lacking for dependably ascertaining the effectiveness of apparent restoration to normal condition of tubing circuits which have been subjected to tests.

When single or contiguous areas are served by a plurality of temperature detecting tubing circuits, it is desirable to avoid impairing or suspending the operability of more than one of such circuits at a time, while subjecting them to tests, in order that abnormal temperature conditions may be manifested during tests.

Such prior mechanism has not only been so complicated in character and of such mass that its presence in any tubing circuit has been a detriment and a source of hazard to the operability thereof, but has frequently been found to be very objectionable on account of its excessive bulk; and the manufacture, utilization and repair of testing mechanisms of this character have been found to be difficult and expensive, and to require for their successful utilization, the exercise of an unusual degree of skill and care.

An important object of this invention is to provide such facilities and methods of testing that, at the conclusion of each test, the effectiveness of the restoration of normal operative conditions may be reliably disclosed.

Another object is to prevent several tubing circuits being concurrently subjected to the abnormal conditions incident to tests.

Other objects are to simplify such systems and the mechanism provided therein, to decrease the bulk of such mechanism, to decrease the cost of manufacture of the constituent parts and the cost of the installation of such systems, to render same capable of safe and effective utilization by those of ordinary skill and care, and to attain other objects together with the inherent advantages in part obvious and in part specifically set forth in the following specification and pointed out in the claims.

When tests are to be made in accordance with this invention, inspectors are each provided with a single pressure altering unit so that, after testing any one tubing circuit therewith, such unit must be removed, thereby restoring such tubing circuit to normal operating conditions, before subjecting any other tubing circuit to abnormal test conditions.

To test for leaks or obstructions, in accordance with this invention, a tubing circuit having a pressure responsive device at one end, and a restricted vent at the other end thereof;—a part of such tubing is isolated from the remainder, the pressure or density of the fluid contents is altered to a predetermined extent in the part of such tubing which is in communication with said pressure responsive device, said isolation is thereupon terminated to permit equalization of pressure throughout such tubing circuit, and observation is made of the time which elapses between the termination of such isolation and a predetermined degree of restoration to normal of the fluid contained in such tubing, as disclosed by such responsive device. Increases, beyond the time of previous tests, indicating stoppages or obstructions, and decreases indicating unintended leakage or lack of intended restriction of the vent.

As a failure to fully reëstablish communication, between parts of the tubing circuit which are temporarily isolated during this test, will produce the effect of an obstruction in the tubing, and failure to fully cut off the source of pressure alteration will have the effect of decreasing the restriction of the vent,—it is evident that such a failure to reëstablish normal operating conditions at the conclusion of this test will be clearly disclosed.

In order to conduct tests in accordance with this invention so as to fully disclose conditions of all parts of a tubing circuit;— each end of such a circuit should be provided with a pressure responsive device and a restricted vent, and,—in addition to observing the time which elapses between the termination of the isolation of part of the tubing from the remainder thereof and the attainment of a predetermined degree of restoration to normal pressure of the fluid contained in the portion of the tubing in which the pressure was initially altered as disclosed by the responsive device connected to the end thereof;—further observation is made of the time which elapses between such termination of isolation and a predetermined change in the pressure of the fluid in the part of said tubing in which pressure was not initially altered, as disclosed by the responsive device connected at the end thereof; further observation being made of the time which elapses between the attainment of such predetermined change and a predetermined degree of restoration to normal pressure of the fluid contained in the portion of the tubing in which the pressure was not initially altered, as disclosed by the responsive device connected to the end thereof. Increases, beyond previous tests, of the time between the termination of isolation and the disclosure of the required pressure by the second responsive device,—indicate either lack of intended restriction of the vent associated with said device or obstruction of the portion of the tubing in which the pressure was not initially altered, while decreases indicate excessive restriction of said vent; and increases in the time of restoration indicate unintended restriction of the vent, while decreases indicate lack of intended restriction of said vent or leakage from the tubing.

If the internal diameter or bore of the tubing employed in a circuit is so small that the friction of the fluid against the tube constitutes an important factor,—and in cases where the pressure responsive devices manifest the attainment or non-attainment of a predetermined change in the pressure or density of the fluid in the tubing circuit without manifesting the degree of greater or lesser changes,—the portion of the tubing circuit in which pressure is initially altered during these tests should be much greater than the portion temporarily isolated therefrom, and, if the responsive devices are set to manifest substantially equivalent pressure changes, or the tubing circuit contains a highly elastic fluid such as air; abnormal pressure should be initially applied to substantially the entire tubing circuit, and the length of the tubing in which pressure is not initially altered should be inconsequential.

Test valves provided for such tubing circuits are ordinarily mounted in cabinets or boxes which are provided with doors, such doors being kept closed and locked except when access to the valves is desired by some authorized person. Because of the relatively small space needed for test valves constructed in accordance with this invention, and the elimination of occasion for mounting pressure altering units in connection therewith, such boxes may be made much smaller than those required for containing the testing facilities heretofore provided for similar installations.

The cabinets or boxes, provided for containing test valves employed in accordance with this invention, should be of such dimensions that the doors thereof cannot be closed while a pressure altering unit is applied to any one of the valves contained therein. Thus providing an additional safeguard against inadvertently leaving a pressure altering unit applied to any test valve, and thereby impairing the operability of the tubing circuit associated therewith.

In equipping tubing circuits in accordance with this invention:—one or more units are provided, each adapted to suitably alter the pressure of the air or other fluid contained in the tubing;—each tubing circuit for which testing facilities are to be provided having connected therein a test valve so arranged as to facilitate the connection thereto of such unit; the relative arrangement and construction of such valves and units being such that when any one of said units is applied to the valve associated with one of said tubing circuits, portions of such circuit will be isolated from each other, and one of such portions will be placed in communication with said unit.

In constructing the test valves which form a feature of this invention; three passages are provided, together with means for connecting one or the other of two said passages with the third, a movable valve member being operable in one direction upon contact therewith of a suitable portion of the unit structure and operable in the opposite direction by a suitable spring. Two of said passages are provided for connection thereto of a tubing circuit, which passages communicate with each other when the valve member has been moved in response to its spring; one of said passages being isolated from the other when said valve member has been moved by application thereto of a portion of the unit structure, and said member is arranged to establish communication between said unit and one of the isolated passages during application of said unit thereto.

In constructing the pressure-altering units which form another feature of this invention:—self-closing means is provided at the outlet of the unit and the pressure-altering mechanism is arranged to retain any setting or adjustment applied thereto;—so that changes in the volume of the fluid contents of the unit may be accurately compared and duplicated; so that the displacement may be determined upon and accomplished within the unit before the application thereof to a test valve; so that changes in the displacement may be made after application of the unit to a test valve; so that the unit may be filled with dry air and, although carried in a damp atmosphere, moisture will not be admitted to the air contained in the unit; so that gases other than air may be employed within the unit and such gases will not escape or be diluted with air while the unit is being transported from the point at which it is filled with dry air or other gas to the point at which tests are to be made; and so that foreign substances will be kept out of the unit during such transportation.

For the purpose of enabling this invention to be more readily understood, an embodiment thereof is shown in the annexed drawing, but this invention is not limited to the particular arrangement there shown and hereinafter described, as many changes may be made in construction and arrangement, and parts may be added or omitted, without departing from the spirit of this invention.

In the accompanying drawing:

Figure 1 diagrammatically represents an application of this invention to a tubing circuit having detectors at each end thereof;

Fig. 2 correspondingly shows an application of this invention to a tubing circuit having detector at but one end thereof;

Fig. 3 is an enlarged view of the test valves shown in Figs. 1 and 2 with a pump applied thereto;

Fig. 4 is a corresponding view of the test valve shown in Fig. 3, the engaging end of the pump detached therefrom but adjacent thereto.

Like reference characters denote similar parts throughout the several views.

Fig. 1 diagrammatically shows an application of this invention to a temperature alarm system of a type well known to those skilled in this art, which system comprises the tubing $a$ together with the pressure responsive devices $c$ and $b$ connected thereto. Said tubing $a$ may contain any suitable fluid having the desired characteristics of expansion and contraction in response to changes in the temperature thereof, but, in the interests of brevity and convenience, said fluid will be hereinafter referred to as air.

The tube $a$ extends through an area to the temperature changes of which it is desired to secure response, and the responsive devices $b$ and $c$ are connected to the respective ends of said tubing and are arranged to suitably vary the electrical condition of circuits associated therewith in response to changes in the pressure of the air contained in said tubing.

The devices $b$ and $c$ are each provided with a so-called "leak" or restricted orifice 21 through which desired compensation may be effected for gradual changes in the pressure of the air contained in said tubing, while assuring desired response of said devices to more sudden or rapid changes.

Signaling means are shown associated with each device, comprising typical electric signaling circuits each including a bell 22, a current source 23, and conductors so connecting them to contacts governed by said devices as to render such bell responsive to predetermined changes in the pressure of the air contained in the tubing.

The test valve $d$ is connected in the tubing circuit and should preferably, from considerations of convenience, be located in close proximity to the responsive devices $b$ and $c$ associated with such circuit.

For operative reasons which will be hereinafter more fully explained, it is important that the test valve shall be connected in the tubing circuit comparatively near one end or the other thereof, being shown in Fig. 1 as being near the end of the tubing circuit $a$ which is connected to the responsive device $b$.

The detailed construction of the test valve $d$ will be better understood by reference to the enlarged views shown in Figs. 3 and 4;— by which it will be seen that this valve comprises base 24 which carries a lug 25 having an opening therethrough communicating with the opening through the tubing 26 which is secured to the underside of the base 24; said tubing 26 being connected to and forming part of the tubing circuit $a$. A flanged body 27 is secured to the base 24, as by means of the attaching screws 28, 28 (shown in Fig. 3 only),—the joint between the base 24 and the body 27 being rendered air-tight, as by the use of the gasket 29.

The interior of the body 27 is recessed to provide a chamber 31, surrounding and extending above the end of the lug 25, and thus forming a channel within which a movable valve member 30 may act. The upper portion of the body 27 has a threaded recess 32 formed therein to receive the threaded nozzle 33 of a pump, which will be hereinafter more fully described,—a suitable passage 34 being provided between the chamber 31 and the recess 32. The under side of the movable member 30 is recessed to receive the end of the lug 25 and contains seat 37 which forms a packing adapted to tightly close the opening through said lug. A stem 35 carried by the member 30 extends upwardly through the passage 34 from the chamber 31 into recess 32 for a purpose which will be hereinafter more fully described. A washer 38 surrounds the stem 35, and forms a packing which rests upon the upper side of the member 30,—and a spring 36 is applied to the lower side of the member 30, thereby normally causing said member to press the washer 38 against the upper end of the chamber 31 and to thereby seal the passage 34.

The member 30 and the stem 35 are somewhat smaller in diameter than the chamber 31 and passage 34, respectively, so that when moved in opposition to the spring 36 a passageway will be provided from the chamber 31 around member 30 and stem 35 into recess 32.

A port 39 is provided in the wall of chamber 31, the outer end of said port being threaded; the screw 40 passes through sleeve 41 into the threaded end of said port; and the washers 42, 42 are provided at the ends of sleeve 41 so as to seal the joints between the ends of said sleeve and the body 27 and the under side of the head of screw 40, respectively.

The body of screw 40 has a groove 43 formed therein, and is smaller than the opening in sleeve 41 through which it passes. A passageway is therefore provided from the chamber 31 through port 39, groove 43 and the space between sleeve 41 and screw 40 into the end 44 of the tube $a$ which is secured in sleeve 41.

A portable pressure altering unit is provided for effecting tests in a manner hereinafter more fully explained. Said unit comprises the pump $e$ having pressure altering mechanism consisting of casing 45, piston blocks 46 and 47 within said casing, threaded piston rod 50, engaging cap 51 and operating handle 52.

The upper side of block 47 has a recess formed therein for receiving the head provided at the lower end of rod 50 and the disk 53. The disk 53 has an opening therethrough for the body of the rod 50, and is secured to the block 47 by the screws 48, 48, so that the head at the lower end of the rod 50 may turn freely between the said block and disk, while moving them lengthwise within the casing 45.

The screws 48, 48 also hold the block 46 in desired relation to the block 47; a packing ring 49 being clamped between the inclined surfaces of said blocks so as to be expanded by the tightening of said screws to provide an air-tight structure.

The cap 51 is firmly secured to the casing 45 and has a threaded opening therethrough which is engaged by the threads upon the rod 50, so that the rotation of said rod by means of the handle 52 will suitably move the piston structure in the casing 45.

The chamber 54 is formed in the lower part of the casing 45, the opening through the nozzle 33 forming an outlet from the lower part of said chamber 54. Said chamber contains self closing means comprising the puppet 58, the stem 56 of which projects through the opening in the nozzle 33 in such position as to be operable by engagement with the end of the stem 35 when said nozzle 33 is secured in the threaded recess 32. The lower end of the chamber 54 forms a valve seat 55 for the puppet 58, the joint between said puppet and said seat being effectively sealed by the packing washer 57.

The diameters of the washer 57 and the puppet 58 are somewhat smaller than the inside diameter of the chamber 54, the diameter of the stem 56 being correspondingly smaller than the inside diameter of the opening through the nozzle 33; to the end that a passageway will be provided around these parts when the puppet 58 is raised above seat 55.

A coiled spring 59 rests upon the puppet 58, said spring being held under tension by the screw 60, so as to normally tend to press the puppet 58 and the washer 57 firmly against the seat 55. An opening 61 being provided through said screw affording communication between the cylinder inclosed by the casing 45, and the chamber 54.

Spring 59 is strong enough to overcome spring 36 and the stems 35 and 56 are of such relative length that, when nozzle 33 is screwed into threaded recess 32, the lower end of stem 56 will be brought against the upper end of the stem 35 during the process of screwing said nozzle 33 into the said recess 32. The movable member 30 will be pressed downwardly until the seat 37 is firmly pressed upon the upper end of the lug 25, thereby sealing the opening in said lug; whereupon during the continued threading of the nozzle 33 into the recess 32, the downward movement of the puppet 58 will be arrested, and the seat 55 will move away from the washer 57 and thus provide a passageway from the chamber 54 around the puppet head 58 and the stem 56 into recess 32, thence around stem 35 to and through port 39, through groove 43 and sleeve 41 into end 44 of the portion of the tubing $a$ which leads to responsive device $c$.

A gasket 62 is provided upon the nozzle 33 for sealing the connection between said nozzle and the threaded recesses of the test valves to which it is applied.

Under normal operative conditions of the alarm system shown in the Fig. 1:—the recess 32 of the test valve d is unoccupied, and the movable member 30 of said valve is held in its elevated position (as shown by Fig. 4) by the spring 36, thereby closing passage 34 and placing port 39 in communication with the opening through lug 25. It is evident that, while in this condition, changes in the temperature of the air contained in the tubing circuit a will tend to cause relative expansion or contraction thereof, which will result in differences between the pressure of the air within said tubing and the surrounding atmosphere. When, however, such changes are gradual (such, for example as those resulting from climatic conditions) comparative equilibrium will be maintained by escape or entry of air through the restricted vents or so called "leaks," 21, 21 of the responsive devices b and c. Said vents are adjusted with reference to the volume of the air contained within the tubing circuit a, so that the rate of air movement through said leaks will be so restricted that the difference in pressure between the contained air and that of the surrounding atmosphere will vary at a rate governed by the rate of change in the temperature of such contained air.

The devices b and c are adjusted to act, in response to a predetermined difference between the pressure of the air contained in the tubing circuit a and that of the surrounding atmosphere, to cause response of the respective bells 22, 22 associated therewith.

In view of the arrangement just described,—it is evident that if the entire tubing circuit a is subjected to an abnormal rate of temperature change (either increase or decrease, as the case may be, dependent upon the arrangement of responsive devices b and c) the bells 22, 22 will sound during the period that such excessive rate of temperature change is taking place, and thereafter until compensation has been effected (through vents 21, 21) of any surplus difference in pressure, between the contained air and the surrounding atmosphere, which may have been built up during such an excessive rate of temperature change. If different parts of the tubing circuit a are subjected to varying rates of temperature change, corresponding action of the devices b and c and the bells 22, 22, will result whenever the change or changes in the temperature of any part or parts of said circuit are such as to cause a difference between the pressure of the contained air and that of the surrounding atmosphere such as that in response to which the devices b and c are set to cause the bells 22, 22 to sound. It is, however, quite evident that if a comparatively short length of the tubing a is subjected to an abnormal rate of temperature change (unless said section is located at a point in the tubing circuit from which the frictional resistance toward the respective responsive devices b and c is equal) the one of said responsive devices separated by least frictional resistance, from the part of the tubing in which an abnormal temperature change has occurred, will respond to such change more quickly than the device which is separated by a run of tubing having a greater frictional resistance.

Should any stoppage occur at any single point within the tubing a, it is evident that devices b and c would nevertheless respond to predetermined pressure changes on the respective sides of such stoppage,—but, should stoppage develop at two or more points, the part or parts of the tubing between such stoppages would be isolated from said responsive devices.

Should the tubing be severed at any one point, the frictional resistance to the flow of air through the severed ends and within said tubing will be sufficient to enable a difference in pressure to be built up at one side or the other thereof (if near the center of the circuit) to cause response of one or the other of the devices b and c (assuming said devices b and c to have such settings as are ordinarily employed for such devices); or, if severed comparatively near one of said devices, to cause responsive action of the device to which the greater length of tubing is connected. If such a tubing circuit is severed at two points, it is evident that there will be no response to pressure or temperature changes occurring between such points.

In view of the foregoing characteristics of the circuit diagrammatically indicated by Fig. 1; the desirability is apparent of making tests which will demonstrate freedom of the tubing circuit a from either breaks or stoppages, as well as disclosing changes, if any, which may develop in the adjustment of devices b and c and the vents 21, 21 associated therewith.

When it is desired to so test the tubing circuit shown in Fig. 1;—the pump e should be applied to the test valve d in said circuit, thus bringing the stem 56 of said pump into engagement with stem 35 of said valve and thereby pressing member 30 downwardly to close the passage through lug 25, and raising puppet 58 from its seat 55 as shown in Fig. 3. The short section 26 of tubing a, at the end of which responsive device b is connected, is thus isolated from the main portion 44 of said tubing circuit a, and therefore from responsive device c.

If now the handle 52 of pump e is turned in suitable direction to a sufficient extent,—the air pressure in the part 44 of tubing circuit a will be so altered as to actuate device c to cause the intended response of the bell 22 associated therewith. If the device c is so arranged as to cause response of the bell 22 to a predetermined increase in the pressure of the air in the tubing circuit a above the surrounding atmosphere,—the handle 52 should be turned in such direction as to move the pressure altering unit or piston of said pump toward the chamber 54; and if said device c is arranged to cause the response of bell 22 when the pressure of the air within the tubing a has been reduced to a predetermined extent below that of the surrounding atmosphere,—the handle 52 should be turned in the opposite direction.

When device c has acted in response to altered pressure in the portion 44 of tubing circuit a, as just described;—the nozzle 33 of pump e should be quickly unscrewed and withdrawn from recess 32,—thereby permitting spring 36 to raise member 30 to uncover the passage through lug 25 and close passage 34, thus reëstablishing communication between the port 39 and the opening through lug 25, so as to reunite the parts of the tubing circuit a previously isolated from each other.

Because of the frictional resistance to the movement of the air in the tubing a toward responsive device c, where it is slowly escaping through vent 21 at the time when said tubing is thus reunited,—the pressure of the air in the portion 44 of said tubing nearest to valve d is less than that of the air within device c and in the tubing adjacent thereto. If, therefore, there is no obstruction in the part 26 of the tubing circuit a leading from test valve d to device b, the passage 34 is tightly closed, and said device b and its associated vent 21 are in proper adjustment,—said device b will quickly act to cause response of its associated bell 22; and, thereafter, if the device c and its associated vent 21 are in proper adjustment, and there are no obstructions or leaks in any part of the tubing a,—the bells 22, 22 associated with said devices b and c, respectively, will cease to respond at about the same time.

Should the tubing a be completely severed or tightly closed between valve d and device c, it is evident that said device will not respond to any alteration in air pressure which is undertaken during the application of pump e.

If a substantial degree of leakage exists in a portion of tubing a nearer to device b than to device c,—the bell 22 associated with said device will act less quickly, if at all, in response to the aforesaid reuniting of the previously isolated parts of the tubing line a, and the response of said bell, if any, will thereafter be of shorter duration than the response of the bell 22 associated with device c. If such a leak is nearer to device c, responses of the bell 22 associated with said device will be of shorter duration than those of the bell 22 associated with device b.

Other conditions of abnormal leakage or partial obstruction will be manifested by corresponding variations in relative times of commencement and durations of the responses.

The foregoing description contemplates the use of the well known type of pressure responsive device diagrammatically indicated by the drawing,—which type is arranged to close the contacts of an electric circuit upon the attainment of a predetermined rate of expansion of the air in the tubing connected therewith. These devices form no part of this invention, and it should be understood that any other suitable pressure manifesting devices, such as well known forms of gages or water or mercury columns, may be utilized in place of either or both of the devices b and c shown in the drawing.

It is also evident that other forms of pressure altering means may be employed, instead of the pump e, especially if graduated gages are substituted for the fixed standard devices b and c; but, when employed as shown, the special structure provided in said pump e enables tests to be made with greater accuracy and effectiveness than prior devices, and the self closing means provided for the nozzle of said pump affords an important safeguard against the accumulation of foreign substances or moisture within the pump, the introduction of which into the tubing during tests thereof would tend to cause stoppages therein, as well as tending to cause leakage of the test valve.

Fig. 2 diagrammatically indicates a type of tubing circuit sometimes referred to as a "single end type", same being characterized by the provision of but one responsive device, indicated in the drawing by the device C.

The restricted vent or so-called "leak" 21 of said device C being supplemented by a restricted vent connected to the opposite end of the tubing circuit, such supplemental vent being diagrammatically indicated at 211.

Normal operative conditions of the alarm system shown in Fig. 2 are similar to those hereinbefore described in connection with Fig. 1,—vents 21 and 211, coöperating so that the difference in pressure between the contained air and that of the surrounding atmosphere will vary at a rate governed by the rate of change in the temperature of such contained air, the device C being adjusted to cause bell 22 to act in response to a predetermined difference between the pressure of the air contained in the tubing circuit A and that of the surrounding atmosphere.

It should be observed that temperature changes localized in the portion of tubing a adjacent to test valve d of Fig. 1, will cause as prompt and effective response of device *b* as would be afforded by device *c* if such temperature changes affected a portion of said tubing circuit *a* adjacent to said device *c;* while corresponding changes in the portion of the tubing circuit A adjacent to the test valve *d* of Fig. 2 may fail to cause intended response of the bell 22 associated with device C. From the foregoing it will be apparent that the arrangement of Fig. 1 is preferable for long tubing circuits, when parts of such circuits are likely to be exposed to different rates of temperature change.

While the arrangement of Fig. 2 may be used in cases where it is unlikely that temperature changes in one part of the tubing line A will be different from those in any other part thereof (as in a case when all of the tubing A is situated in an undivided area),—it should be noted that if the tubing A is completely severed or tightly closed at any point, the device C will be unresponsive to pressure changes in the portion of the tubing A situated between such point and the test valve *d*.

When it is desired to test the tubing circuit shown in Fig. 2,—the pump *e* should be applied to the test valve *d* in the said circuit in the manner already described in connection with Fig. 1,—whereupon the bell 22 associated with device A will respond, unless the tubing A is severed or tightly closed.

When said bell 22 has thus responded,— the nozzle 33 of pump *e* should be quickly withdrawn, thus reuniting vent 211 with tubing circuit A. A comparison between different tests of such features as the movement which must be imparted to the handle of pump *e*, the time which elapses between the completion of such movement and response thereto of the bell 22, and the duration of such response after the disconnection of the pump *e* from the valve *d*,—will disclose the presence of any abnormal leaks or obstructions in the tubing A, as well as disclosing changes in adjustment of the device C or the vent 21 associated therewith, or stoppage of vent 211 or leakage through recess 32 of valve *d*.

What I claim and desire to secure by Letters Patent of the United States is:

1. The process of testing a line of fluid-filled tubing for leaks or obstructions therein; consisting of closing an end of said line and of varying the pressure or density of the fluid in said line to a predetermined extent, thereupon opening said closed end through a vent restricted in accordance with a previously determined standard and observing the time required for a given degree of restoration of the normal pressure of said fluid.

2. The process of testing a line of fluid-filled tubing for leaks or obstructions therein; consisting of isolating a part of said line from the remainder thereof, varying the pressure or density of the fluid in said isolated part to a predetermined extent, thereupon terminating such isolation and observing the time required for the communication of a predetermined variation of the pressure of the fluid contained in the remainder of said line.

3. The process of testing a line of fluid-filled tubing for leaks or obstruction therein, and simultaneously testing the operability of a responsive device connected at one end of said line and of a restricted vent connected at the other end of said line; consisting of temporarily isolating said vent from said line, varying the pressure or density of the fluid in said line to a predetermined extent during such isolation, thereupon terminating such isolation and observing the time required for the response of said device to the restoration of normal pressure resulting from the flow of the fluid through said vent.

4. The process of testing a line of fluid-filled tubing for leaks or obstructions therein, and simultaneously testing the operability of responsive devices and vents connected at the ends of said line, respectively; consisting of temporarily isolating the device and vent at one end of said line from the remainder of said line, applying a predetermined change in the pressure or density of the fluid in said line from the end nearest said isolated device of the portion isolated from said device, observing the time required for the response of the non-isolated device to such change, thereupon terminating the aforesaid isolation and observing the time required for the response of the previously isolated device to said increase in pressure.

5. A line of tubing of small bore containing an elastic fluid, a pressure responsive device at one end of said line, and a restricted vent at the other end thereof; in combination with a three-way valve, two outlets of which are connected in said line and the third outlet of which is so formed and arranged as to facilitate connection of a suitable pressure varying means therewith.

6. A line of tubing of small bore containing an elastic fluid, a pressure responsive device at one end of said line, and a restricted vent at the other end thereof; in combination with a three-way valve, two outlets of which are connected in said line at a point adjacent to said vent, and the third outlet is so formed and arranged as to facilitate connection of a suitable pressure varying means therewith.

7. A line of tubing of small bore containing an elastic fluid, pressure responsive devices at the ends of said line, and restricted vents associated with said devices, respectively; in combination with a three-way valve, two outlets of which are connected in said line and the third outlet of which is so formed and arranged as to facilitate connection of a suitable pressure altering means therewith.

8. A line of tubing of small bore containing an elastic fluid, a pressure responsive device at one end of said line, and a restricted vent at the other end thereof; in combination with a three-way valve, two outlets of which are connected in said line at a point adjacent to said vent and the third outlet is so formed and arranged as to facilitate connection of a suitable pressure varying means therewith, said valve comprising means for either connecting said line therethrough and closing said third outlet, or connecting said third outlet to the part of said line to the end of which the responsive device is connected and isolating said vent.

9. A plurality of tubing circuits, pressure responsive devices and restricted vents at the ends of said circuits, respectively; in combination with test valves connected in said circuits, respectively, and a pressure altering unit arranged for connection to any one of said valves, each of said valves being operable by the connection thereto of said unit to isolate a part of the tubing circuit associated with such valve from the remaining part of said circuit and to place such unit in communication with one of said parts.

10. A line of tubing of small bore containing an elastic fluid, a pressure responsive device at one end of said line, and a restricted vent at the other end thereof; in combination with a test valve connected in said line and having an aperture so formed and arranged as to facilitate connection of a suitable pressure altering means therewith, said valve comprising a member operable during such connection of a pressure altering means to connect said aperture to part of said line and to isolate the remainder of said line therefrom.

11. A line of tubing of small bore containing an elastic fluid, a pressure responsive device at one end of said line, and a restricted vent at the other end thereof; in combination with a test valve connected in said line and having an aperture so formed and arranged as to facilitate connection of a suitable pressure altering means therewith, said valve comprising a member operable during such connection of a pressure altering means to connect said aperture to part of said line and to isolate the remainder of said line therefrom, and resiliently yielding means opposing such operation of said member.

12. A plurality of tubing circuits, pressure responsive devices and restricted vents associated with said circuits, respectively; in combination with test valves, one for each of said circuits, and a portable pressure altering unit having an outlet arranged for connection to any one of said valves, and having self-closing means operable to open said outlet by contact with any one of said valves when connected therewith.

13. A line of tubing of small bore containing an elastic fluid, a pressure responsive device at one end of said line, and a restricted vent at the other end thereof; in combination with a valve, two outlets of which are connected in said line and a third outlet of which is so formed and arranged as to facilitate connection of a suitable pressure altering means therewith, said valve comprising a movable member so formed and arranged that, when in one position, said two outlets are open and said third outlet is closed, when in a second position, said two outlets and said third outlet are open, and when in a third position, the one of said two outlets leading to the vent is closed, the other of the said two outlets and the said third outlet being open; means constantly tending to place and hold said member in said first-named position, and means operable by the application of such a suitable pressure altering means for moving said valve to said second and third-named positions.

14. A line of tubing of small bore containing an elastic fluid, pressure responsive devices and restricted vents connected at the ends thereof; in combination with a test valve connected in said line,—said valve comprising means normally permitting communication between the portions of said tubing at opposite sides of said valve, said means being operable to close such communication and to establish communication between the portion of said tubing on one side of said valve and an outlet of said valve through which pressure from an external source may be applied.

15. A line of tubing containing an elastic fluid, pressure responsive devices and restricted vents at the ends of said line; in combination with a three-way test valve connected in said line; a detached pump having a suitable nozzle fitted into an outlet of said valve for ready connection thereto; a puppet valve in said nozzle; and means normally tending to hold said puppet valve closed; said test valve being so constructed and arranged as to be operable by connection thereto of said pump to isolate a portion of said line associated therewith from the remaining part thereof, and so as to thereupon open said puppet valve.

In witness whereof, I hereunto subscribe my name, this 14th day of April, 1919.

THOMAS H. S. CONE.